UNITED STATES PATENT OFFICE.

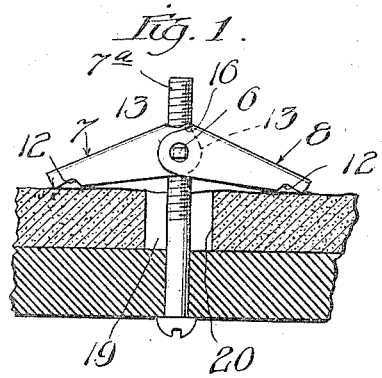
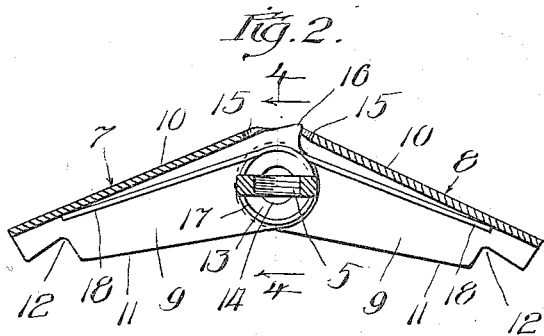
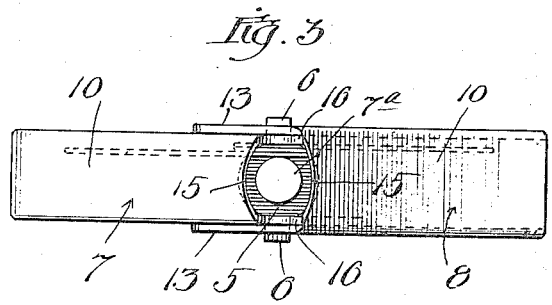
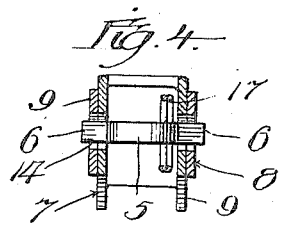
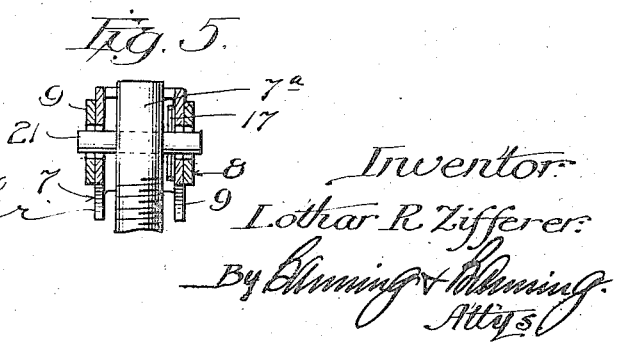

LOTHAR R. ZIFFERER, OF RIDGEWOOD, NEW JERSEY.

TOGGLE-BOLT.

1,228,512. Specification of Letters Patent. Patented June 5, 1917.

Application filed October 21, 1916. Serial No. 126,973.

*To all whom it may concern:*

Be it known that I, LOTHAR R. ZIFFERER, a citizen of the United States, residing at Ridgewood, Bergen county, New Jersey, have invented certain new and useful Improvements in Toggle-Bolts, of which the following is a specification.

This invention relates to toggle bolts of the double-wing type, such as are adapted to support objects against hollow walls or ceilings.

For its objects my invention aims to provide means independent of the bolt, or other screw threaded member used, for limiting the unfolding movement of the toggle head wings; means for preserving the wings in an obtuse angular relation to each other so that only their extremities bear upon the inner surface of the wall; means for permitting the toggle head to adjust itself angularly of the bolt so that it may rest squarely against the inner surface of the wall; and means for preventing the toggle head from rotating within the wall when the bolt is tightened against the work. These and other objects of my invention will more fully hereinafter appear from the specification and claims, and from the accompanying drawings, in which:—

Figure 1 is an elevation of a toggle bolt embodying my invention, shown operatively positioned within a hollow wall;

Fig. 2 is an enlarged sectional view of the toggle head;

Fig. 3 is a plan view of the toggle head;

Fig. 4 is a cross-section through the toggle head on line 4—4 of Fig. 2; and

Fig. 5 is a cross section through a toggle head mounted directly on the bolt.

Referring more particularly to Figs. 2 and 3, I have represented a nut or collar 5 having trunnions 6 extending therefrom on opposite sides, and formed with suitable threads to receive a bolt 7ª, such as is shown in Fig. 1. Upon the trunnions 6 wings 7 and 8 are coaxially pivoted. The wings and collar together constitute what is known as the toggle head. Each of the toggle wings is U-shaped in cross-section, as appears best in Fig. 4, being provided with side walls 9 and a top or connecting wall 10. The edges 11 of the side walls 9 face the inner wall surface and at their outer extremities are notched or toothed as at 12. The side walls of each wing at their inner ends terminate in ears 13 which overlap the trunnions 6, registering openings 14 being formed therein, within which the trunnions 6 may lie. In this manner the wings are co-axially pivoted upon the collar, so that they may be folded down upon the bolt or unfolded to the position shown in the several figures of the drawing.

It will be observed from Figs. 3 and 4 that the side walls of the wing 8 are spaced apart a sufficient distance to receive between them the walls 9 of the wing 7, so that the ears 13 of the wing 7 are positioned within the corresponding parts of the wing 8. The wall 10 of each wing adjacent the ears 13 is cut away as at 15 to leave an opening through which the bolt 7ª may project. This opening is sufficiently wide at all times to allow the toggle head to swing upon the trunnions 6 so that its angular relation to the bolt may be varied to meet requirements. For the purpose of limiting the unfolding of the wings and arresting their swinging movement at a definite point, I have shaped the ears 13 on the wing 7 to provide shoulders 16, which engage with the wall 15 of the wing 8 when the wings are fully unfolded. The location of these shoulders 16, relative to the wall 15, is such that the opening movement of the wings is arrested before they can reach positions 180° apart. For this reason the wings assume an arch-like or truss-like final position with the center pivotal point elevated with respect to the end or bearing points. Within the toggle head I have arranged a spring 17, the ends 18 of which bear against the under side of the wings near their outer extremities, so as to normally cause the wings to unfold to the position shown in the several figures of the drawing.

In use, the wings of the toggle head are folded down upon the bolt against the tension of the spring 17. On account of their U-shaped formation, they are enabled to fold one within the other and each upon the bolt so as to occupy a minimum space. A hole 19, no larger than necessary to receive the device in this condition, is prepared in the wall 20 and the toggle head threaded to the bolt is then inserted. As soon as the wings have passed through the opening, they will spring open in position to bear against the inner wall surface, as shown in Fig. 1.

It will be observed that only the extremities of the wings bear against the inner surface of the wall. This is desirable, as thereby the load is supported by the wall at points removed from the hole through which the toggle bolt was inserted. In actual practice, moreover, it is found that the inner wall surfaces are irregular, so that the toggle head is frequently required to bear against uneven surfaces. The present toggle bolt is so constructed that the toggle head can adjust itself angularly of the bolt, as may be required by the uneven surfaces on the inner side of the wall, thereby allowing the bolt to maintain a position which is perpendicular to the outer wall surface.

At the time the bolt is tightened against the work, there is a tendency for the toggle head to be revolved with it. This is especially true if friction develops between the threads of the bolt and collar. To overcome this tendency, I have provided in each of the wing's edges 11 a notch near its extremity. By this construction the bearing edge of each wing presents two or more points which may contact with the inner wall surface. This means is found to be very effective in preventing rotation of the toggle head, due to the fact that I have thereby increased the number of points which engage with the inner wall surface. It may be found preferable to arrange all of the contact points on the two wings 7 and 8 in alinement, so that those near the center of the toggle head will be as likely to initially engage with the inner wall surface as the remaining points.

In Fig. 5 I have shown a modification of the present toggle bolt, in which the bolt is not movable longitudinally of the toggle head. In this construction the collar 5 is omitted altogether. A pin 21 is extended transversely through the bolt 7ª to provide in effect trunnions on which the toggle wings 7 and 8 may be mounted. Except for the fact that the position of the bolt cannot be shifted longitudinally of the toggle head, this construction is the same as that previously described. Other modifications of the present toggle bolt may obviously be made without departing from the spirit and scope of my invention as defined by the scope of the appended claims.

I claim:

1. In a device of the kind described, the combination of a bolt, a nut threaded on the bolt, and coaxially pivoted wings carried by the nut, the wings being U-shaped in cross section and arranged to fold upon the bolt with the side walls of the wings overlapping the bolt, there being means independent of the bolt for limiting the unfolding movement of the wings with respect to each other, substantially as described.

2. In a device of the kind described, the combination of a bolt, a nut threaded on the bolt, co-axially pivoted wings carried by the nut, and a shoulder on one wing arranged to engage with the other wing to limit the opening movement of the wings, each of the wings at its pivotal end having a portion thereof cut away to provide an opening through which the bolt may protrude without engaging with the wings when the wings are in distended relation, substantially as described.

3. In a device of the kind described, the combination of a bolt, a nut threaded on the bolt, wings pivotally mounted on the nut on opposite sides of the bolt, a shoulder on one wing arranged to engage with the other wing to limit the opening movement of the wings, each of the wings at its pivotal end having a portion thereof cut away to provide an opening through which the bolt may protrude without engaging with the wings when the wings are in distended relation, and a tension device for normally causing the wings to assume distended positions relative to each other, substantially as described.

4. A toggle head having wings with bearing surfaces normally in such angular relation to each other that they engage with a wall only at their extremities, the engaging portions of the bearing surfaces being notched to provide additional points of contact, substantially as described.

5. In a device of the kind described, the combination of a bolt, a pair of wings pivotally mounted in operative relation with the bolt on opposite sides thereof and provided with bearing surfaces, and means for normally causing the wings to swing out from the bolt a fixed distance only whereby the bearing surfaces of the wings tend to remain in a definite angular relation to each other, the portions of the wings adjacent the bolt being cut away to provide a clearance therearound whereby the wings may be freely adjusted angularly of the bolt without altering their angular relation to each other, substantially as described.

6. In a device of the kind described, the combination of a bolt, and wings pivotally mounted in operative relation to the bolt, each wing being provided with a wall engaging surface, there being means independent of the bolt for arresting the swinging movements of the wings at a point where the wings remain always in such relative angular relation that they contact with the wall only at their extremities, substantially as described.

7. In a device of the kind described, the combination of a bolt, and wings pivotally mounted in operative relation to the bolt, each wing being provided with a wall engaging surface formed with a plurality of contact elements at its swinging end, there being means independent of the bolt for arresting the swinging movement of the wings to always present only the contact elements for engagement with the wall, substantially as described.

8. In a device of the kind described, the combination of a bolt, a nut threaded on the bolt, wings pivotally mounted on the nut, and means for normally causing the wings to swing out from the bolt, the wings being arranged to engage with each other to limit their outwardly swinging movement, substantially as described.

9. In a device of the kind described, the combination of a bolt, a nut threaded on the bolt, wings pivoted to the nut, and a shoulder on one wing arranged to engage with the other wing to limit the distending movements of the wings, substantially as described.

LOTHAR R. ZIFFERER.